US008182404B2

(12) United States Patent
Hansmann et al.

(10) Patent No.: US 8,182,404 B2
(45) Date of Patent: May 22, 2012

(54) METHOD FOR CONVERTING A TRIMMING MACHINE FOR THE PREFERABLY THREE-SIDED TRIMMING OF A STACK OF SHEETS

(75) Inventors: Rolf Hansmann, Verden (DE); Andreas Lange, Wunstorf (DE); Bernd Lustermann, Riede (DE)

(73) Assignee: Wohlenberg Buchbindesysteme GmbH, Verden (DE)

( * ) Notice: Subject to any disclaimer, the term of this patent is extended or adjusted under 35 U.S.C. 154(b) by 1086 days.

(21) Appl. No.: 12/039,147

(22) Filed: Feb. 28, 2008

(65) Prior Publication Data

US 2008/0216623 A1 Sep. 11, 2008

(30) Foreign Application Priority Data

Mar. 7, 2007 (DE) ........................ 10 2007 011 391
Jun. 1, 2007 (DE) ........................ 10 2007 025 756

(51) Int. Cl.
*B23Q 3/155* (2006.01)
*B23Q 7/04* (2006.01)
*B26D 1/09* (2006.01)

(52) U.S. Cl. .................. 483/1; 483/28; 483/14; 483/16; 483/7; 83/954; 414/790.2

(58) Field of Classification Search ............. 483/28–29, 483/14–15, 1, 16, 7, 10; 100/98 R; 83/954, 83/640, 641; 414/789.9, 790.2
See application file for complete search history.

(56) References Cited

U.S. PATENT DOCUMENTS 1,267,283 A 5/1918 Seybold
3,528,332 A * 9/1970 Des Jardins et al. ............ 83/214
4,300,427 A * 11/1981 Rathert ........................... 83/934
4,615,249 A * 10/1986 Geiser ............................ 83/934
4,922,773 A 5/1990 Ito
6,520,058 B2 * 2/2003 Nakajima et al. ............... 83/934
6,796,209 B2 * 9/2004 Boss .............................. 83/365
2002/0092394 A1 * 7/2002 Rathert ........................... 83/934
2002/0148339 A1 * 10/2002 Zechini ........................... 83/934
2003/0145703 A1 * 8/2003 Rohe-Krebeck ................ 83/934
2005/0016341 A1 * 1/2005 Lorenzi ............................ 83/13

FOREIGN PATENT DOCUMENTS

DE 41 13 797 A1 11/1991
DE 101 24 068 A1 2/2002
DE 10 2004 016 373 A1 11/2004
EP 0 542 385 A 5/1993

OTHER PUBLICATIONS

DE Search Report, apparently dated Dec. 18, 2007.
European Search Report, dated Jun. 16, 2008.

* cited by examiner

*Primary Examiner* — Erica E Cadugan
(74) *Attorney, Agent, or Firm* — Laurence P. Colton; Smith Risley Tempel Santos LLC

(57) ABSTRACT

The invention provides for the replacement of the cutting plate (15) and the press die (16) to be carried out automatically, specifically with the aid of a positioning device for positioning the stack of printed sheets (11) to be trimmed under the press die (16). In this way, the automatic conversion of the automatic three-knife trimmer for a format change is possible without a significant change to the automatic three-knife trimmer. Only the control system of the positioning device has to be changed and expanded. The positioning device (21) automatically ensures that the new press die (16) and the new cutting plate (15) are positioned exactly. In particular, the positioning of the die plate (19) under the format plate (18) can be carried out automatically by means of the positioning device with the required high accuracy, to be specific with higher accuracy than would be possible manually.

24 Claims, 4 Drawing Sheets

METHOD FOR CONVERTING A TRIMMING MACHINE FOR THE PREFERABLY THREE-SIDED TRIMMING OF A STACK OF SHEETS

STATEMENT OF RELATED APPLICATIONS

This patent application claims convention priority on and is based on German Patent Application No. 10 2007 011 391.0 having a filing date of 7 Mar. 2007 and German Patent Application No. 10 2007 025 756.4 having a filing date of 1 Jun. 2007, both of which are incorporated herein by this reference in their entireties.

BACKGROUND OF THE INVENTION

1. Technical Field

The invention relates to a method for converting a trimming machine having a press die and a cutting plate for the preferably three-sided trimming of a stack of sheets. This invention relates to a method for converting a trimming machine having a press die and a cutting plate for the preferably multi-sided trimming of a stack of sheets, the cutting plate and the press die being replaced in order to change the format of the stack of sheets. This invention relates to a method for converting a trimming machine having a press die and a cutting plate for the multi-sided trimming of a stack of sheets, the cutting plate and the press die fixed to a press die holder being replaced in order to change the format of the stack of sheets.

2. Prior Art

When converting trimming machines for the preferably three-sided trimming of a stack of sheets, which in the specialist jargon are designated "automatic three-knife trimmers", use is made of a stationary lower cutting plate and a press die that can be moved up and down in order to compress the stack of sheets as it is trimmed.

The press die and the cutting plate are matched to the respective sheet format. For this purpose, the press die and the cutting plates correspond to the cutting knives. For this reason, in the event of changing paper formats, the press die and the cutting plate have to be changed in order to match the sheet format to be trimmed in each case. Hitherto, the conversion of the trimming machine which was necessitated as a result was carried out manually. This requires not only time but, above all, experience and skill as well; this is because, above all, the die plate of the press die, which is normally formed of paperboard, must be adhesively bonded underneath a format plate of the press die, generally formed of hardwood, in an accurate relative position in relation to the format plate, since, even in the event of small deviations from the intended position, bonding the die plate under the format plate would result in damage to the die plate and above all to the cutting knives.

BRIEF SUMMARY OF THE INVENTION

Taking the above as a starting point, the invention is based on the object of devising a method for the time-saving conversion of the trimming machine and in particular for the accurate positioning of the press die, preferably the die plate.

A method for achieving this object is a method for converting a trimming machine having a press die and a cutting plate for the preferably multi-sided trimming of a stack of sheets, the cutting plate and the press die being replaced in order to change the format of the stack of sheets, wherein at least parts of the press die are replaced by a positioning device for positioning the stack of sheets to be trimmed under the press die. Accordingly, provision is made to replace at least the press die or parts of the press die by a positioning device for positioning the stack of sheets to be trimmed under the press die. In this way, in the event of a format change, at least partly automated conversion of the trimming machine is possible. The special feature of this at least partial automatic conversion of the trimming machine is that use is made of the positioning device which is present in any case for positioning the stack of sheets to be trimmed under the press die. Consequently, to this extent no additional device needs to be provided for the at least partly automatic conversion of the trimming machine. As a result of using the existing positioning device, only the control system of the same has to be extended, so that the positioning device can be used not only for positioning stacks of sheets to be trimmed under the press die but also for the at least partial replacement of the press die during a conversion of the format of the trimming machine.

A further method for achieving the object mentioned at the beginning, which can also be a preferred development of the method mentioned above, is a method for converting a trimming machine having a press die and a cutting plate for the multi-sided trimming of a stack of sheets, the cutting plate and the press die fixed to a press die holder being replaced in order to change the format of the stack of sheets, wherein the press die fixed to the press die holder is automatically uncoupled from the press die holder and another press die is automatically coupled to the press die holder. According to the latter, provision is made for the press die fixed to a press die holder to be uncoupled automatically from the press die holder and for another press die to be coupled to the press die holder, preferably also automatically. As a result, the change in the format of the trimming machine is also automated. In particular, the automatic uncoupling of the press die from the press die holder and the likewise automatic coupling of the press die to the press die holder, together with the replacement of at least one part of the press die by the positioning device, leads to a substantially fully automatic format change.

The press die of the trimming machine usually has a format plate holder, a format plate and a die plate. By using the format plate holder, the press die is fixed under the press die holder. The format plate is fixed to the format plate holder, while the die plate is arranged under the format plate, preferably detachably. In the case of a press die constructed in such a way, according to a further development of the method, provision is made to replace the format plate holder with the format plate and preferably also the die plate automatically by means of the positioning device. In this case, the format plate holder, with the format plate and the die plate fixed underneath, can be jointly replaced automatically. However, it is also conceivable to replace the format plate holder with the format plate fixed underneath and the die plate separately during a format change, in that firstly the format plate holder with the format plate is positioned under the press die holder and preferably coupled automatically and then the die plate is positioned under the format plate and fixed.

According to a development of the method, provision is made that, at the start of the conversion operation, the entire press die, preferably the format plate holder, the format plate and the die plate, is moved away from the press die holder by the positioning device in a direction in which the trimmed stack of sheets is also transported away. As a result, in order to change format, the positioning device carries out approximately the same movement as for the output transport of trimmed stacks of sheets. Provision is preferably made for the positioning device also to transport the press die, in particular the format plate holder, the format plate and the die plate, away as a whole on an output conveyor, which is also used for the output transport of trimmed stacks of sheets. Thus, the output conveyor can also be used for the automatic format change.

If the format plate holder and the format plate, on the one hand, and the die plate, on the other hand, are positioned separately under the press die holder, then firstly the format plate with the format plate holder carrying the latter is positioned under the press die holder by the positioning device and coupled hereto. This is followed by moving the press die holder up with the format plate holder coupled thereto and the format plate fixed to the latter. In this way, space is created for the likewise automatic positioning of the die plate under the format plate.

The connection of the die plate fed in separately to the format plate is likewise carried out automatically, by the format plate coming into contact with the die plate as a result of the press die being moved down. Thus, the die plate can be connected to the format plate in the envisaged relative position in relation to the latter. This is preferably done by adhesive bonding. As a result, a connection between the format plate and the die plate is made in a straightforward manner when the format plate presses against the die plate as a result of the press die being moved down.

According to a preferred development of the invention, provision is made for the cutting plate to be replaced automatically as well. This is preferably also done by means of the positioning device, which is also used to replace at least parts of the press die.

For the purpose of automatic replacement of the cutting plate, provision is firstly made to raise the cutting plate by means of a lifting device before it is moved away under the press die and the press die holder by the positioning device. The positioning device preferably also moves the cutting plate away under the press die in the same direction as that in which the trimmed stacks of sheets are transported away.

Provision is further made to position a new cutting plate automatically under the press die holder as well by means of the positioning device. This is preferably done before a new press die is arranged under the press die plate. The previously replaced cutting plate simplifies the positioning of a new press die under the press die holder, in particular the connection of the die plate to the format plate.

A new cutting plate, supplied in an exactly positioned manner by the positioning device, is lowered again by the lifting device. The cutting plate positioned exactly in this way is then automatically fixed in a holder for the cutting plate by a clamping device. As a result, fully automatic replacement of the cutting plate is also possible.

According to a further refinement of the method, provision is made that, by means of moving the press die up or down, it is determined whether there is a die plate under the format plate and also the thickness of the format plate with the die plate is determined. As a result, it is firstly possible to determine whether the correct new press die has been arranged in the trimming machine during the conversion. However, in this way it is also possible to determine whether or not there is already a die plate under the format plate. Should there be no die plate under the format plate, the control system receives a signal that it must carry out further operating cycles in order to position the die plate under the format plate automatically and to join the die plate automatically to the format plate, in particular to bond it adhesively.

Furthermore, according to the method, provision can be made to use the positioning device to determine whether the press die has been coupled properly to the press die holder. To this end, the positioning device is moved to a dimension which is smaller than the intended dimension of the stack of sheets to be cut. If the press die has not been coupled to the press die holder, it is still lying on the cutting plate and, when the positioning device is moved, a collision occurs between the positioning device and the press die or the die plate. The control system of the trimming machine then determines that a predefined maximum force for moving the positioning device has been exceeded, which is an indication that the coupling of the press die to the press die holder has not been carried out.

BRIEF DESCRIPTION OF THE DRAWINGS

Preferred exemplary embodiments of the invention will be explained in more detail below by using the drawing, in which:

FIG. 3 shows a view according to FIG. 2 as a trimmed stack of sheets is transported away and an untrimmed stack of sheets is fed in.

DETAILED DESCRIPTION OF PREFERRED EMBODIMENTS

Figure 1:
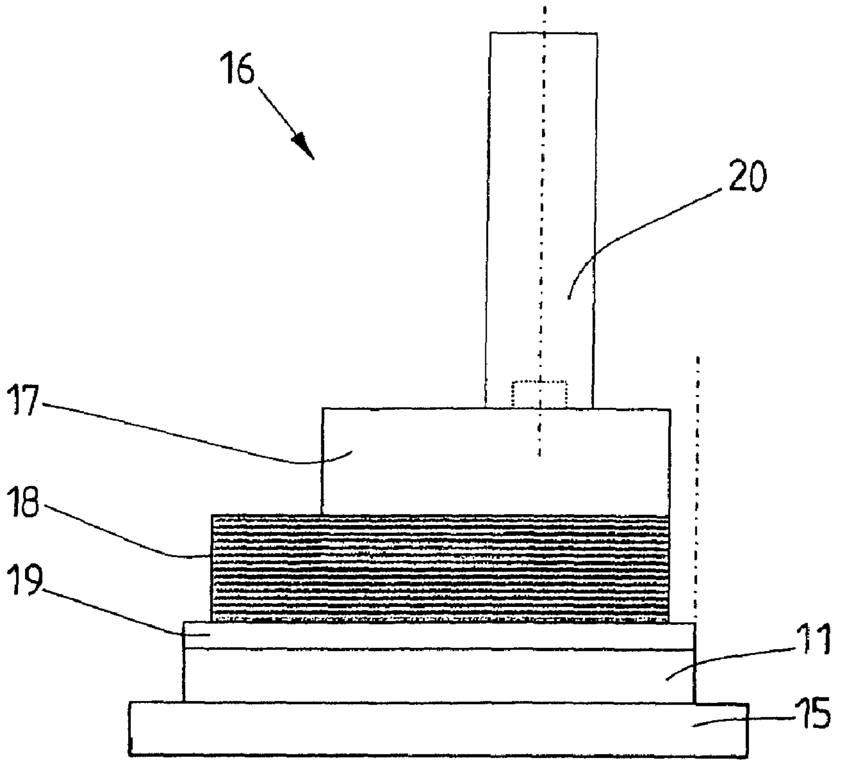
FIG. 1 shows a schematic side view of the trimming machine in the region of a press die and a cutting plate.
Figure 2:
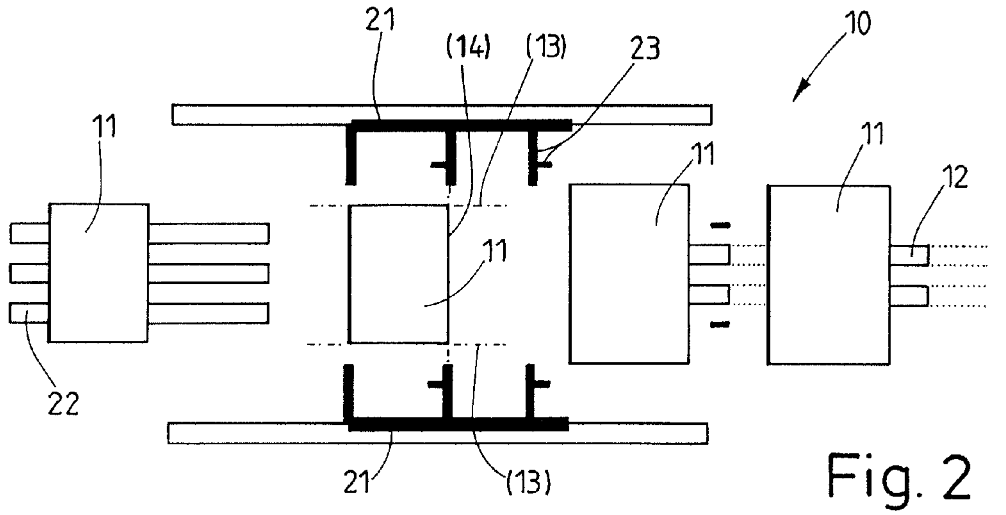
FIG. 2 shows a schematic plan view of the entire trimming machine following the trimming of a stack of sheets.
Figure 3:
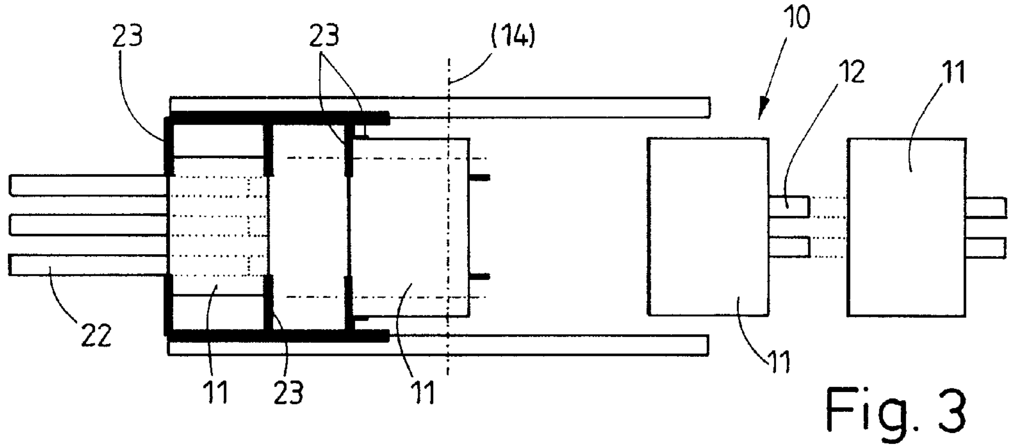
Figure 4:
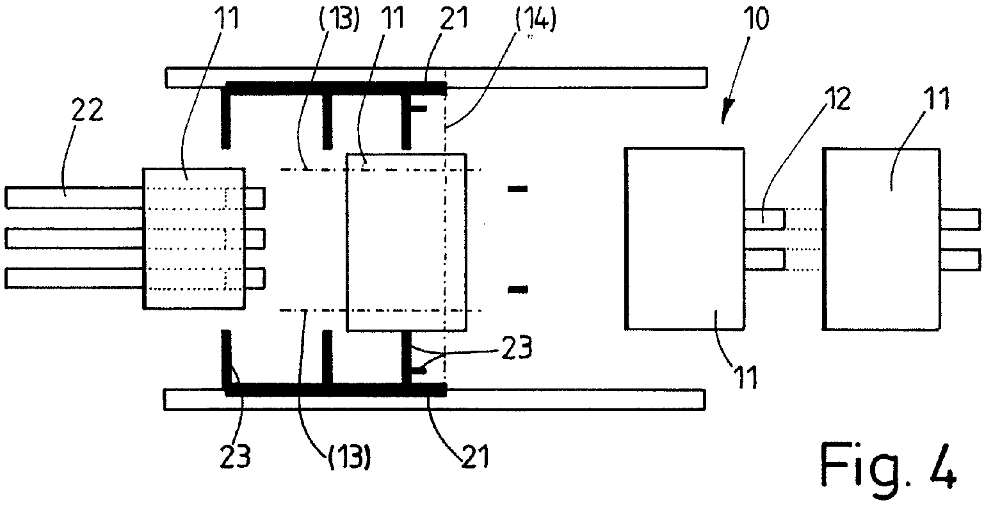
FIG. 4 shows a view according to FIGS. 2 and 3 after the trimmed stack of sheets has been transported away and after the positioning of a following untrimmed stack of sheets under the press die.
Figure 5:
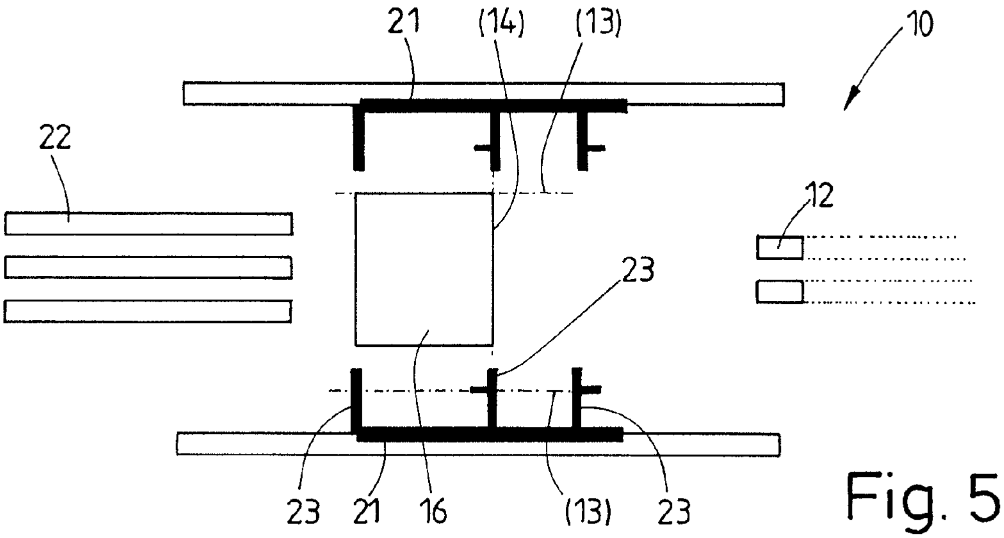
FIG. 5 shows the trimming machine before the replacement of the press die in a view analogous to FIGS. 2 to 4.
Figure 6:
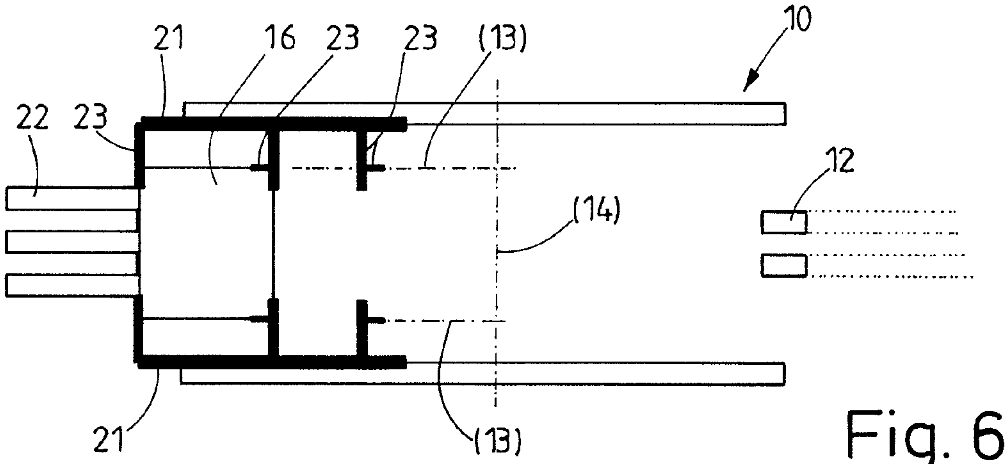
FIG. 6 shows a view analogous to FIG. 5 during the replacement of the press die.
Figure 7:
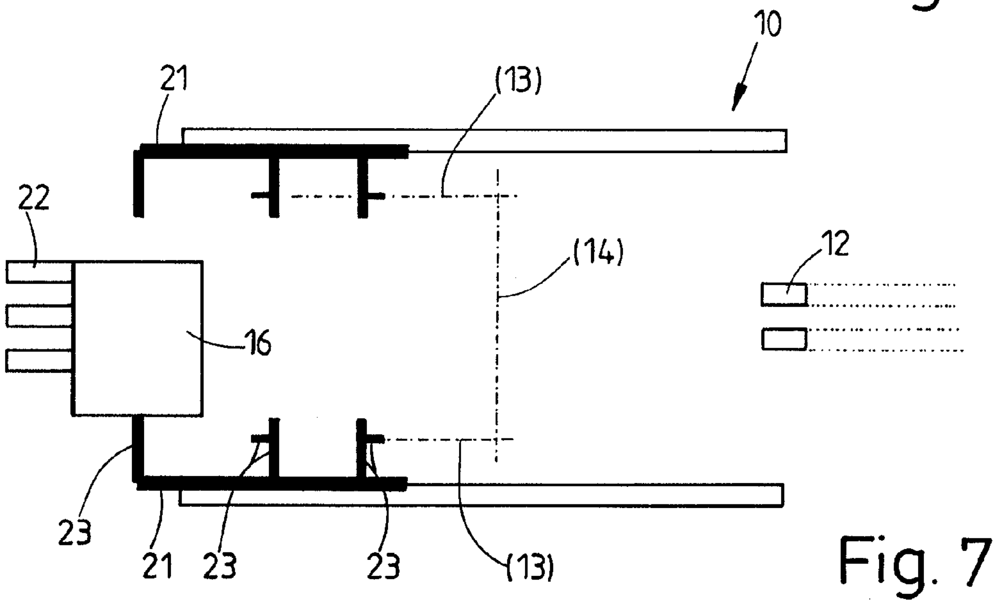
FIG. 7 shows a view analogous to FIGS. 5 and 6 with a press die to be replaced deposited on a delivery belt.
Figure 8:
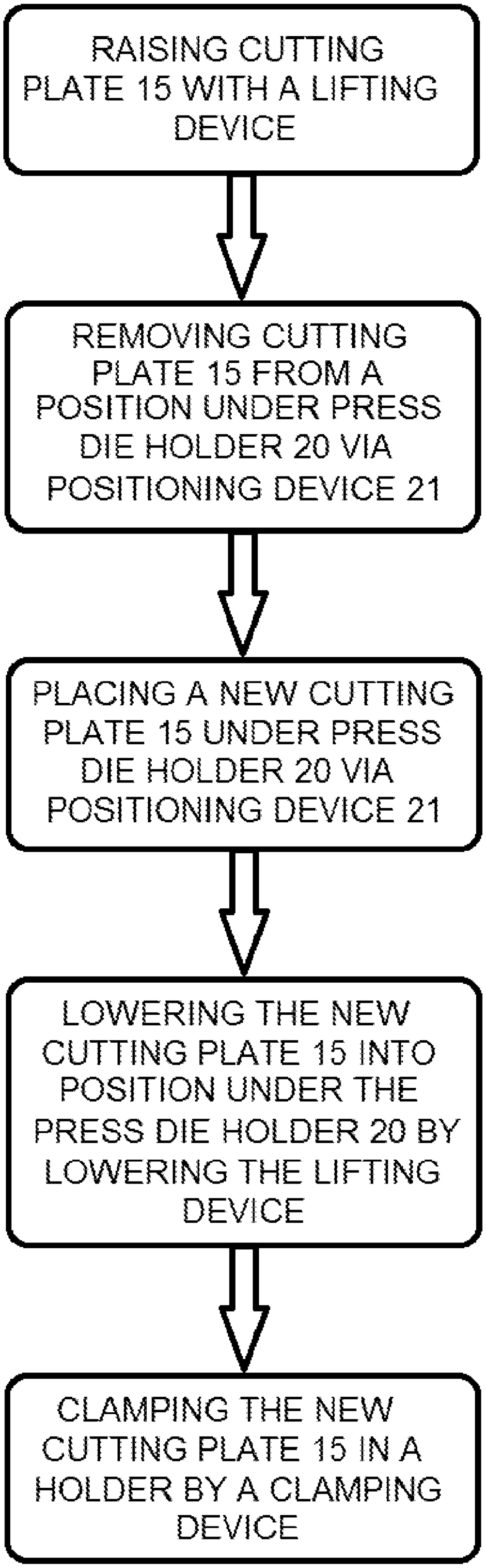
FIG. 8 shows a schematic representation of the method of replacing the cutting plate of the trimming machine.

The invention will be explained below by using a trimming machine designed as an automatic three-knife trimmer. By using the automatic three-knife trimmer 10, a stack of sheets, which, for example, is a stack of printed sheets 11 for the production of bound printed products (books or the like), can be trimmed on three sides.

The automatic three-knife trimmer 10 has a feeder 12, illustrated only schematically in FIGS. 2 to 7, with which stacks of printed sheets 11 can be fed in preferably individually, so that a stack of printed sheets 11 is always available for trimming in the automatic three-knife trimmer 10.

The automatic three-knife trimmer 10 has three cutting knives 13 and 14, specifically two parallel cutting knives 13 running longitudinally in the feed direction of the stack of printed sheets 11 and a transversely oriented cutting knife 14. The cutting knives 13 and 14, thus running at right angles to one another in each case, are used for the purpose of trimming three perpendicular edges of the stack of printed sheets 11. A fourth side of the stack of printed sheets 11, which later forms the spine of the book, remains untrimmed.

During cutting, the stack of printed sheets 11 rests on a cutting plate 15 illustrated only in FIG. 1. The base area of the cutting plate 15 corresponds with the format to which the stack of printed sheets 11 is to be cut by the three cutting knives 13 and 14, is specifically only a minimum amount larger. As a result, the cutting plate 15 serves as a mating surface for the cutting knives 13 and 14, in that the cutting knives 13 and 14 move toward the cutting plate 15.

A press die 16 is used for the purpose of holding and pressing together the stack of printed sheets 11 in the exact position during the three-sided trimming. The press die 16, which can be moved up and down, presses from above on the stack of printed sheets 11 to be trimmed, so that the latter is non-displaceably fixed between the cutting plate 15 and the press die 16 during the trimming.

FIG. 1 shows schematically the press die 16 and the cutting plate 15 of the automatic three-knife trimmer 10. Accordingly, the press die 16 has a format plate holder 17, a format plate 18, normally of hardwood, arranged underneath and a die plate 19, normally of paperboard, arranged under that. The press die 16, which is to say the format plate holder 17, the format plate 18 and the die plate 19, is detachably connected to an upper press die holder 20 that can be moved up and down. The press die 16 with its format plate holder 17 can be coupled to the press die holder 20 by an automatic coupling device, not shown, and can likewise be uncoupled automatically from the press die holder 20 for the purpose of a format change. The format plate 18 is screwed to the format plate holder 17. For a format change, joint replacement of the format plate holder 17 with the format plate 18 fixed underneath it is carried out. On the other hand, the die plate 19 can be detached from the format plate 18 as required. For this purpose, the die plate 19 is firmly bonded under the format plate 18 by means of a suitable detachable adhesive bond. For example, the adhesive bond can be produced by means of double-sided adhesive tape. The die plate 19 rests on the top of the stack of printed sheets 11.

At least the die plate 19 is matched to the format of the edges of the stack of printed sheets 11 to be trimmed by the cutting knives 13 and 14. For this purpose, the appropriate edges of the die plate 19 end approximately flush with the cutting plane of the cutting knives 13 and 14. The edges of the die plate 19 assigned to the cutting knives 13 and 14 can be at a small distance from the respective cutting knife 13, 14, so that a narrow gap remains between the relevant edge of the cutting knife 13 or 14 and the corresponding edge of the die plate 19. The cutting plate 15 is dimensioned to be somewhat larger than the format of the stack of printed sheets 11. The cutting plate 15 projects laterally, at least with respect to the edges to be trimmed of the stack of printed sheets 11, or protrudes laterally with respect to the edges to be trimmed of the stack of printed sheets 11 (FIG. 1). The cutting plate 15 is either formed from a softer material than the cutting knives 13 and 14 or, in the regions projecting laterally with respect to the stack of printed sheets 11, has softer mating surfaces which, for example, are formed by inserts of a soft material in the cutting plate 15. As the stack of printed sheets 11 is trimmed, the cutting knives 13, 14 come into contact with these soft mating surfaces of the cutting plate 15, so that the tips of the cutting knives 13, 14 are not damaged.

A positioning device 21, shown only schematically in FIGS. 2 to 7, is used to move an untrimmed stack of printed sheets 11, kept ready by the feeder 12 in front of the press die 16, under the press die 16 and to position it exactly there, in particular to align it in relation to the cutting plate 15 and to the die plate 19. The positioning device 21 is also used to move a trimmed stack of printed sheets 11 away under the press die 16 and to push it onto a delivery belt 22 used to transport trimmed stacks of printed sheets 11 away.

The automatic three-knife trimmer described above is suitable for automated format change by means of an appropriate control system, in particular for the drive for moving the press die holder 20 up and down and the positioning device 21, for which purpose at least the press die 16, preferably also the cutting plate 15, can be replaced automatically by a press die 16 and, if appropriate, a cutting plate 15 for another format, which is to say a stack of printed sheets 11 with another base area. At least the replacement of the press die 16, including uncoupling and re-coupling to the press die holder 20, is carried out automatically according to the invention, in particular fully automatically. However, provision is preferably made as well to automate the replacement of the cutting plate 15 by one such for another format. For this purpose, however, it is necessary to modify the apparatus of the automatic three-knife trimmer 10, in that the holder for the cutting plate 15 has a lifting device, with which the cutting plate located in the holder in a countersunk manner can be raised for the automated replacement. In addition, there is then associated automatic coupling of the holder for the cutting plate 15, with which the cutting plate 15 can be uncoupled automatically from the holder and, following the replacement of the cutting plate 15 by a new one, can be re-coupled automatically.

In the following text, the method according to the invention for converting the automatic three-knife trimmer 10 by using a fully automated format change will be described.

Following the three-sided trimming of the last stack of printed sheets 11 of one format and the outward transport of the last stack of printed sheets 11 onto the delivery belt 22, the drive of the automatic three-knife trimmer 10 moves the entire press die, that is to say the format plate holder 17, the format plate 18 and the die plate 19, down from the press die holder 20 until it makes contact with the cutting plate 15. Automatic, preferably pneumatic, detachment of the connection between the press die 16 and the press die holder 20 is then carried out, by the format plate holder 17 of the press die 16 being uncoupled automatically from the press die holder 20. After that, the press die holder 20 without the press die 16 detached from the latter is moved up into a rest position. The entire detached press die 16 with the die plate 19 is then gripped by the positioning device 21. This is preferably done by means of a form fit. The positioning device 21 then pushes the press die 16 onto the delivery belt 22 in the outward conveying direction. The press die 16 previously employed is removed manually from said delivery belt 22.

Subsequently, the cutting plate 15 is automatically detached from its locking means in the automatic three-knife trimmer 10, preferably pneumatically. The detached cutting plate 15 is then raised by lifting rails of a lifting device, not shown, into the working plane of the positioning device 21. The detached and raised cutting plate 15 is then gripped with a form fit by the positioning device 21 and conveyed away onto the delivery belt 22, from which the cuffing plate 15 is taken off manually. Therefore, the disassembly of all the previous width-format dependent and height-format dependent parts of the automatic three-knife trimmer 10 has been completed. There still remain replaceable parts which relate to the stack height. The replacement of the cutting plate 15 is not necessary at each format change. Since the cutting plate 15 is somewhat larger than the format of the stack of printed sheets 11 to be trimmed, it projects with respect to the latter, at least on the three sides to be trimmed. If, then, the format changes only a little with the stack of printed sheets 11 to be trimmed next, in particular becomes smaller, so that a sufficiently large edge region of the cutting plate 15 projects laterally with respect to the stack of printed sheets 11, the replacement of the cutting plate during the format conversion is rendered superfluous.

For the installation of the replaceable parts of the new cutting format, firstly a new cutting plate 15, a new format plate holder 17 with format plate 18 fixed thereto and a die plate 19 are placed manually on the delivery belt 22. This is done in the order mentioned above, i.e. with the new cutting plate 15 located at the front. The new die plate 19 has already been prepared to such an extent that there is an adhesive, for example at least one adhesive strip of double-sided adhesive tape, on its upper side, with which the die plate 19 is later bonded firmly under the format plate 18.

The positioning device then firstly grips the cutting plate 15 located at the front. The cutting plate 15 is brought by the positioning device 21 under the press die holder 20 that has been moved up, is placed on the lifting rails of the lifting device, which have been moved up, and is positioned there, in particular aligned. After that, the lifting rails are lowered and the cutting plate is fixed automatically in its holder by an appropriate clamping system.

The positioning device 21 is then moved to the delivery belt 22 again. The delivery belt 22 is then driven in the direction of the positioning device 21, specifically until the format plate 18 with the format plate holder 17 fixed thereto is resting on stops 23 of the positioning device 21. The stops 23 of the positioning device 21 block the further transport of the format plate holder 17 and of the format plate 18 in the direction of the press die holder 20. The drive of the delivery belt 22 is then stopped. The positioning device 21 then moves the format plate holder 17 and the format plate 18 under the press die holder 20 and places and aligns them there exactly in the envisaged position.

After the positioning device 21 has deposited the format plate holder 17 and the format plate 18 as a unit exactly under the press die holder 20, the press die holder 20 is moved down onto the format plate holder 17. The format plate holder 17 is then coupled automatically to the format plate 18 by a preferably pneumatic clamping system under the press die holder 20. By using the lifting travel covered by the drive of the press die holder 20 as the latter is lowered onto the format plate holder 17, it is possible to determine whether there is already a die plate 19 under the format plate 18 or not. In the case described here, in which the die plate 19 is fed in separately, the displacement transducer of the drive of the press die holder 20 would have to determine that there is no die plate 19 under the format plate 18. Otherwise, the changeover operation would already be completed, so that the further operations outlined below can be omitted.

Then, by moving the positioning device 21, it is determined whether the format plate holder 17 with the format plate 18 has been coupled properly to the press die holder 20. This is specifically because the format plate holder 17 with the format plate 18 must then no longer be located on the cutting plate 15, so that the positioning device 21 can be moved without resistance to a dimension which is smaller than the intended dimension of the stack of printed sheets 11 to be trimmed. If, on the other hand, the format plate holder 17 with the format plate 18 has not been coupled properly to the press die 16, the format plate holder 17 and the format plate 18 remain lying on the cutting plate 15 and, as a result, there is a collision between the positioning device 21 and the format plate holder 17 or the format plate 18. The operation of coupling the format plate holder 17 with the format plate 18 to the press die 16 is then repeated and a check is then again made by the positioning device 21 to see whether the new coupling operation was successful.

The positioning device 21 is subsequently moved to the delivery belt 22 again. The delivery belt 22 is then driven again in order to move the die plate 19 against the stops 23 of the positioning device 21. Once this has been done, which can be detected by sensors, if appropriate, the drive of the delivery belt 22 is stopped. The positioning device 21 then moves the die plate 19 under the format plate 18 that has been moved up and positions the die plate 19 there in the correct relative position in relation to the format plate 18 and to the cutting plate 15. After that, the press die holder 20 lowers the format plate holder 17 fixed underneath it with the format plate 18 onto the die plate 19 positioned in the predefined position under the format plate 18. In the process, the format plate 18 is pressed onto the die plate 19, the adhesive connection between the die plate 19 and the format plate 18 being made by the adhesive previously applied to the upper side of the die plate 19. By means of the displacement transducer of the drive of the press die holder 20, it is again possible to check the height of the press die 16, in particular the die plate 19. Here, a comparison with intended thicknesses of the individual parts of the press die 16 can be carried out. These predefinitions are then stored in the control system in relation to the respective format. Thus, it is not only possible to detect whether a format plate 18 and a die plate 19 are present; instead even the height, specifically the thickness, of the same can be determined automatically. In this way, without manual entries, the control system contains the requisite data about the thickness of the format plate 18 and/or the die plate 19. Thus, after each individual conversion operation, the exact thicknesses of the die plate 19 and of the format plate 18 are known. Accordingly, the automatic three-knife trimmer 10 can be operated with a minimum distance between the press die 16 and the respective stack of printed sheets 11. This leads to short cycle times of the automatic three-knife trimmer 10.

The automatic three-knife trimmer 10 is then prepared for cutting stacks of printed sheets 11 using another cutting format.

The invention does not relate to the fully automatic format conversion explained previously in an automatic three-knife trimmer 10; instead, the invention relates to a partly automated format change. For example, provision can be made to carry out only the coupling and uncoupling of the press die 16 from the press die holder 20 and/or the coupling and uncoupling of the cutting plate 15 to and from its holder automatically. Alternatively or additionally, it is conceivable to replace only the press die 16 automatically in the manner described above and to perform the replacement of the cutting plate 15—if this is necessary during the respective changeover operation—conventionally, specifically manually. Finally, it is also conceivable to perform only the replacement of the press die 16 and/or the cutting plate 15 automatically but to carry out the coupling and uncoupling of the press die 16 and the cutting plate 15 manually.

LIST OF DESIGNATIONS

- 10 Three-knife trimmer
- 11 Stack of printed sheets
- 12 Feeder
- 13 Cutting knife
- 14 Cutting knife
- 15 Cutting plate
- 16 Press die
- 17 Format plate holder
- 18 Format plate
- 19 Die plate
- 20 Press die holder
- 21 Positioning device
- 22 Delivery belt
- 23 Stop

What is claimed is:

1. A method for converting a trimming machine having a press die holder (20), a press die (16), and a cutting plate (15), for the multi-sided trimming of a stack of sheets, the cutting plate (15) and the press die (16) in order to change the format of the stack of sheets, wherein at least parts of the press die (16) are replaced by a positioning device (21) that is also used for positioning the stack of sheets to be trimmed under the press die (16).

2. The method as claimed in claim 1, wherein the press die (16) is fixed to the press die holder (20) and is uncoupled automatically from the press die holder (20) and another press die (16) is automatically coupled to the press die holder (20).

3. The method as claimed in claim 2, wherein the positioning device (21) determines whether the press die (16) has been coupled correctly to the press die holder (20).

4. The method as claimed in claim 1, wherein the press die (16), with a format plate (18) and a format plate holder (17) carrying the format plate (18), are replaced by the positioning device (21).

5. The method as claimed in claim 4, wherein at least the format plate holder (17), with the format plate (18) fixed to the format plate holder (17), are replaced jointly by the positioning device (21).

6. The method as claimed in claim 4, wherein the format plate holder (17) with the format plate (18), on the one hand, and a die plate (19) of the press die (16), on the other hand, are positioned separately under the press die holder (20) by the positioning device (21).

7. The method as claimed in claim 4, wherein, before the positioning of a die plate (19) of the press die (16) under the format plate (18), the format plate holder (17) with the format plate (18) positioned under the format plate holder (17) is automatically coupled to the press die holder (20), and the format plate (18) with the format plate holder (17) is moved up by the press die holder (20).

8. The method as claimed in claim 7, wherein, following the positioning of the die plate (19) by the positioning device (21) under the format plate (18) that has been moved up, the die plate (19) is connected to the format plate (18) by lowering the format plate (18) onto the die plate (19), which is done by the press die holder (20).

9. The method as claimed in claim 1, wherein the entire press die (16) is moved away from a position under the press die holder (20) by the positioning device (21).

10. The method as claimed in claim 1, wherein the press die (16) is moved away from a position under the press die holder (20) by the positioning device (21) in a direction in which the trimmed stack of sheets is also transported away from a position under the press die holder (20).

11. The method as claimed in claim 1, wherein a new press die (16) is positioned under the press die holder (20) by the positioning device (21).

12. The method as claimed in claim 1, wherein the cutting plate (15) is replaced automatically by the positioning device (21).

13. The method as claimed in claim 12, wherein the cutting plate (15) is first raised by a lifting device before it is moved away from a position under the press die (16) by the positioning device (21).

14. The method as claimed in claim 13, wherein a new cutting plate (15) is positioned in the region under the press die holder (20) by the positioning device (21).

15. The method as claimed in claim 14, wherein the new cutting plate (15) positioned in the region under the press die holder (20) is lowered by the lifting device.

16. The method as claimed in claim 15, wherein the lowered cutting plate (15) is automatically fixed in a holder by a clamping device.

17. The method as claimed in claim 1, wherein the cutting plate (15) and the press die (16) are fixed to the press die holder (20), and wherein the press die (16) fixed to the press die holder (20) is automatically uncoupled from the press die holder (20) and another press die (16) is automatically coupled to the press die holder (20).

18. The method as claimed in claim 17, wherein the press die (16) includes a format plate holder (17), a format plate (18), and a die plate (19).

19. The method as claimed in claim 17, wherein the press die (16), with a format plate (18) and a format plate holder (17) carrying the format plate (18), are replaced by the positioning device (21).

20. The method as claimed in claim 19, wherein at least the format plate holder (17), with the format plate (18) fixed to the format plate holder (17), are replaced jointly by the positioning device (21).

21. The method as claimed in claim 19, wherein, before the positioning of a die plate (19) under the format plate (18), the format plate holder (17) with the format plate (18) positioned under the format plate holder (17) is automatically coupled to the press die holder (20), and the format plate (18) with the format plate holder (17) is moved up by the press die holder (20).

22. The method as claimed in claim 17, wherein the entire press die (16) is moved away from a position under the press die holder (20) by the positioning device (21).

23. The method as claimed in claim 17, wherein a new press die (16) is positioned under the press die holder (20) by the positioning device (21).

24. The method as claimed in claim 17, wherein the positioning device (21) determines whether the press die (16) has been coupled correctly to the press die holder (20) by moving the positioning device (21) to a predetermined position and determining whether or not a collision occurred.

* * * * *